USOO5743641A

United States Patent [19]
Geiger

[11] Patent Number: 5,743,641
[45] Date of Patent: Apr. 28, 1998

[54] APPARATUS FOR POWER MEASUREMENT OF LASER IRRADIATION

[76] Inventor: Franz Geiger, Via Lavorascio I-21027, Ispra, Italy

[21] Appl. No.: 633,812
[22] PCT Filed: Sep. 30, 1994
[86] PCT No.: PCT/EP94/03268
§ 371 Date: Aug. 23, 1996
§ 102(e) Date: Aug. 23, 1996
[87] PCT Pub. No.: WO95/09350
PCT Pub. Date: Apr. 6, 1995

[30] Foreign Application Priority Data

Sep. 30, 1993 [LU] Luxembourg .................. 88 413

[51] Int. Cl.⁶ .................................................. G01K 17/20
[52] U.S. Cl. ........................... 374/32; 374/179; 374/208
[58] Field of Search .................. 374/10, 12, 32, 374/39, 40, 41, 43, 179, 208; 356/43; 250/338.1, 338.3

[56] References Cited

U.S. PATENT DOCUMENTS

| 4,429,999 | 2/1984 | Bimberg et al. ........................ 374/32 |
| 5,098,195 | 3/1992 | Halyo et al. ........................... 374/10 |
| 5,209,567 | 5/1993 | Loosen et al. ......................... 374/32 |

FOREIGN PATENT DOCUMENTS

| 465559 | 10/1975 | U.S.S.R. ................................. 374/32 |
| 789690 | 12/1980 | U.S.S.R. ................................. 374/32 |
| 1733 | 12/1915 | United Kingdom ...................... 374/32 |

OTHER PUBLICATIONS

*Electrical Review*, "Research and development", vol. 188, No. 2, (8 Jan. 1971), pp. 59–60.

*Primary Examiner*—G. Bradley Bennett
*Attorney, Agent, or Firm*—Bardehle, Pagenberg, Dost, Altenburg, Frohwitter, Geissler

[57] ABSTRACT

This invention relates to an apparatus for power measurement of laser irradiation. The apparatus according to the invention is comprised of a first elongate body forming a hollow space and consisting of a metallic wall of a small thickness. It has on a first longitudinal end thereof an opening for receiving laser irradiation. In the hollow space thereof it has at least in an area covered by the laser irradiation a black and/or rough surface. On the first longitudinal end and on the second longitudinal end thereof it respectively has a heat detector as well as a further heat detector which can be respectively coupled to a means for processing electrical output signals of the heat detectors. A second elongate body surrounds the first body on the longitudinal sides and on the second longitudinal end thereof and, together with said first body, forms an intermediate space wherein a vaporable heat transfer medium can be inserted.

15 Claims, 1 Drawing Sheet

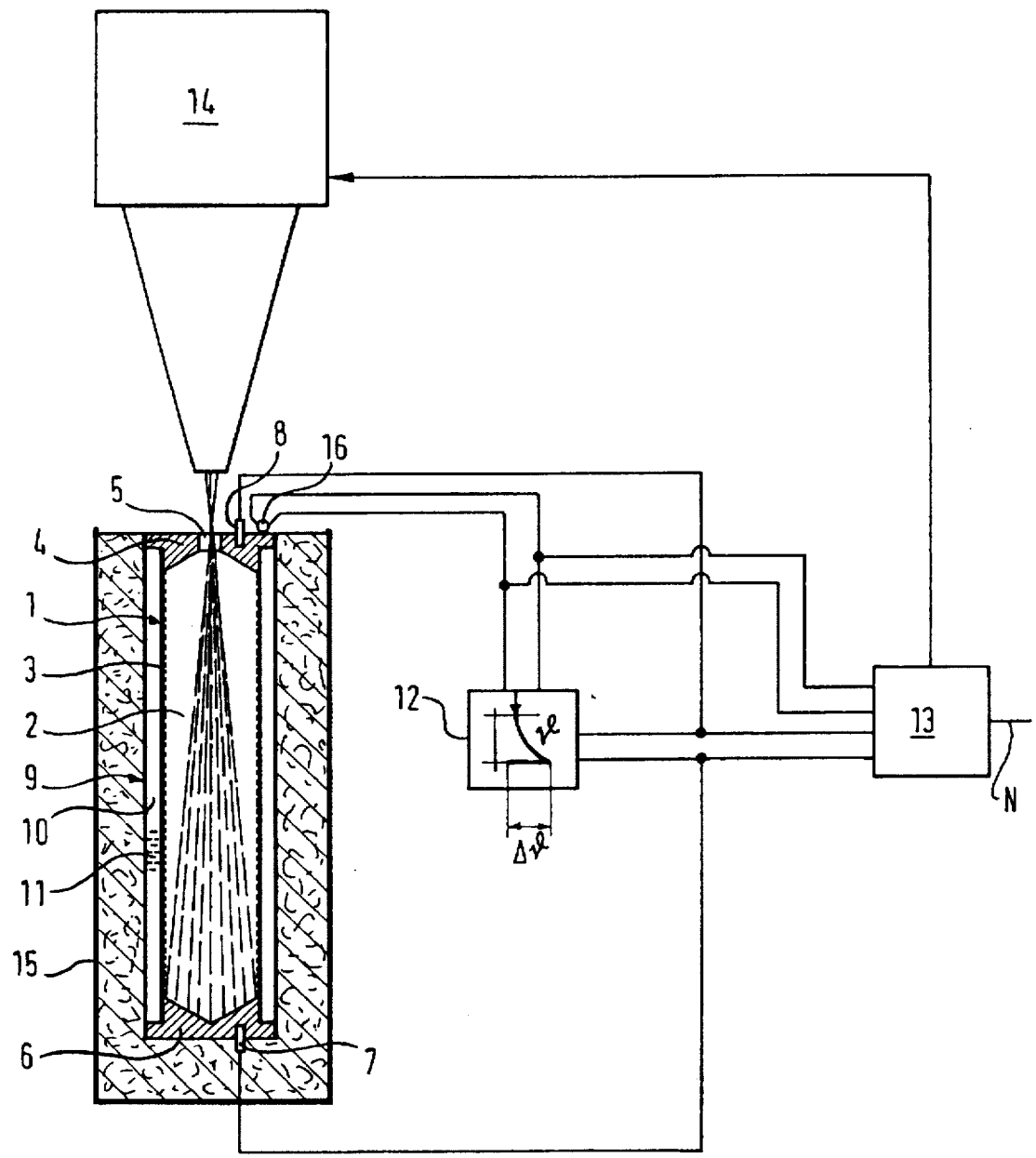

APPARATUS FOR POWER MEASUREMENT OF LASER IRRADIATION

This invention relates to an apparatus for power measurement of laser irradiation.

BACKGROUND OF THE INVENTION

Laser irradiation, particularly $CO_2$-laser irradiation, is used for varied purposes in industry, medicine and research. An important field of application is the treatment of materials, especially metals, with the aid of laser irradiation. In the case of the $CO_2$-laser, the radiation energy is directed through optical elements such as mirrors for example onto material surfaces in order to expose the same to heat effect of the laser irradiation. Laser irradiation is introduced in the material surface to be treated continuously or in pulse form. One condition for the practical application of laser irradiation in the field of material treatment is the observance of a pre-selected variable or constant power output. For example, cooling systems of a $CO_2$-laser produced by Rofin Sinar Laser GmbH and rated 5 kW output are equipped with a heat accumulation tank holding 5,000 liters in order to minimize temperature fluctuations of the cooling water. A cooling water temperature fluctuation by 0.5° C. would cause a power change on the laser by approx 2%. Such power changes during the treatment of workpieces may lead to considerable damage and render the treated workpieces unserviceable.

To realize the sufficiently exact observance of the power curve or the constancy of laser irradiation power the power of the laser irradiation is checked on the last beam outlet opening prior or subsequent to a working step. The measuring is effected for example calorimetrically. In this, a heat insulated submass m, in particular a copper mass, is heated by means of a laser pulse by a temperature amount of $\Delta L$. Then the temperature increase of the mass is measured after reaching the isothermal temperature distribution in the metal mass. The power of the laser irradiation is then determined according to the following equation:

$$N = \frac{m C \Delta}{\Delta t} \ [W]$$

$m$ = mass in [g]

$C$ = specific heat capacity; $C_{cu} = 0.386 \left[ \frac{Ws}{g \, grd} \right]$ $\Delta \sigma$ = temperature increase [degrees]

$\Delta t$ = pulse time [s]

The pulse time can also be a time in which a metal mass wiping through under a continuous laser beam is hit by the laser beam and is heated by $\Delta l$. However, this method of measuring is subject to considerable errors: Ideally, the total given laser irradiation energy is introduced in the metal body by absorption of the laser light on the surface of the metal body to be heated; the value s as the ratio between the energy which is introduced in the metal body and the energy totally applied then is 1. Reflections of the laser light on the surface of the metal body however prevent complete absorption and cause corresponding errors of the measuring method. Attempts to reduce the reflection to sufficiently small values by blackening and roughening the surface of the metal body to be heated do not lead to satisfactory results. One reason therefor is that the body optically cannot be brought to a lasting blackening degree of almost 100%. Disadvantages of the known measuring method also reside in that under the effect of the laser irradiation, particularly at higher power densities, layers generated for the purpose of blackening are changed or applied layers are stripped so that the absorption coefficients are destabilized and insufficiently maximized.

SUMMARY OF THE INVENTION

Therefore, the invention aims at providing an apparatus for power measurement of laser irradiation which produces sufficiently exact measuring results.

According to one aspect of the invention, there is provided an apparatus for power measurement of laser irradiation comprising: a first elongate body forming a hollow space and being comprised of a metallic wall consisting of a material of small thickness and good thermal conductivity, said body having an opening for receiving the laser irradiation on a first longitudinal and thereof, a black and/or rough surface at least in an area covered by the laser irradiation in the hollow space thereof, and a heat detector each on the first longitudinal and a second longitudinal thereof, said heat detector being respectively adapted to be coupled to a means processing electrical output signals of the heat detectors, a second elongate body surrounding the first body on the longitudinal sides and on the second longitudinal end thereof and, together with said first body, forming an intermediate space wherein a vaporable heat transfer medium can be inserted.

With the apparatus according to the invention it is made possible to measure laser irradiation precisely at the location where otherwise the laser irradiation is used for example for material treatment. During the usual $CO_2$-laser power measurement a component beam is branched directly behind the laser output window and directed onto a photocell which then outputs an almost power-equivalent electrical signal. This indication is inexact and also does not cover power reductions occurring through the optical elements between the output window and the last beam output opening. Power measurement of the laser irradiation can be effected also at high power densities (by virtue of the pulsing of the laser irradiation).

BRIEF DESCRIPTION OF THE DRAWINGS

The invention will now be described by way of the drawing FIGURE showing the structure of the apparatus and the co-operation of the individual components at the power measurement of laser irradiation.

DETAILED DESCRIPTION OF THE INVENTION

The apparatus consists of a first elongate body 1 particularly formed as a cylinder or polygonal body which shell is comprised of a metallic wall 3 forming a hollow space 2. The body 1 is a so-called "black body" known per se. The wall has a small thickness of 1 mm for example. It consists of a material of good thermal conductivity, preferably of copper. On a first longitudinal end 4 of the first body 1 is provided an opening 5 serving to receive laser irradiation from an installation which in the drawing FIGURE is shown above the apparatus according to the invention. The first body 1 is closed on its second longitudinal end 6 opposing the first longitudinal end 4 and accordingly said opening 5. The opening has a diameter which corresponds to the cross section of the laser irradiation plus a tolerance. The opening has a diameter of 2 mm for example.

A second elongate body 9 surrounds the first body 1 on the longitudinal sides and on the second longitudinal end thereof. The first body and the second body are particularly formed as cylinders preferably arranged coaxially to each other or as polygonal bodies.

The first body and the second body 1, 9 form an intermediate space 10 to which can be introduced a vaporable heat transfer medium 11. As a heat transfer medium there are used for example water, alcohol, acetone or cooling agents which are used in (home) cooling aggregates. The intermediate space 10 is a closed annular gap having inserted therein the heat transfer medium.

The hollow space 2 of the first body has a black and/or rough surface at least in the area which is covered by laser irradiation. Preferably, the entire surface of the hollow space 2 is black and/or rough in order to produce a degree of emission respectively absorption s of almost 1. The blackening is effected for example by oxidation; the roughening of the surface is effected for example by a fine-pitch thread or by knurling.

The ratio of length and diameter of the cylinder forming the first body 1 is dimensioned sufficiently great with view to sufficiently exact measuring results, the tolerance of components relevant for the power measurement. Preferably, the ratio of cylinder length and cylinder diameter of the first body 1 is greater 3. For example, the diameter is selected to be 12 mm and the length to be 90 mm. Particularly advantageous are greater lengths in order to realize a black body.

The intermediate space 10 which is formed by the first body and the second body particularly has a capillary structure. This capillary structure supplies the heat transfer medium to the metallic wall 3 of the first body on the outside thereof without requiring special installations such as pumps for example.

On both longitudinal ends 4, 6 of the first body heat detectors 7, 8 are arranged which are especially formed as a copper-constantan thermocouple. Preferably, the copper component is formed by the metallic wall 3 of the first body. Accordingly, both heat detectors have a common copper leg, their inherent time constants are practically 0 due to this fixing mode. The heat detector 8 thereof, by means of which the temperature of the irradiation input area on the first longitudinal end 4 of the first body 1 is measured, like the heat detector 7 arranged on the opposing end of the first body 1 also has a constantan wire in addition to the copper cover, said constantan wire being connected to the respective cover in an electrically conducting fashion. On the outputs thereof which are connectible to a means 12 for forming values of differences in temperature the two heat detectors 7, 8 deliver electrical output signals in response to the respective temperature at the measuring position, said output signals being supplied to said means 12.

The e.m.f. or voltage to be measured on the ends of the two constantan wires of the two heat detectors 7, 8 is Zero during temperature equalization, referred to the two opposite longitudinal ends 4, 6 of the body 1, as the two heat detectors 7, 8 are in opposition series connection and the corresponding two thermo voltages are directed against each other.

On the first longitudinal end 4 is further provided an independent thermo element 16 which measures the temperature 8 there.

Laser irradiation entering the apparatus through opening 5 on the first longitudinal end 4 of body 1 heats the black body. The heat transfer medium filled in the intermediate space 10 vaporizes already upon only local heating of a part of the metal wall 3 and/or cylinder bottom (second longitudinal end 6 of the body 1). On the lower temperature spots of the inner wall 3 as well as on the inner wall 9 the heat transfer medium in the hollow space 10 condenses. To this end a relatively rapid heat expansion in the thin metallic wall (mass m) is effected. The energy introduced by the laser pulse accordingly isothermally heats the metallic body within a relatively short time. From the time of introduction of the laser pulse up to the time of the maximum temperature value $l_{max}$ any considerable heat does not escape from the body 1 through dissipation, convection or radiation so that the temperature 1 is hardly reduced.

At the beginning transfer of heat from the portion in which the laser irradiation occurs in the hollow space towards the first longitudinal end having the opening the equalization of temperature starts in the body 1. The temperature in the area of opening 5 reaches its maximum in the isothermal state of the body 1 and thereafter slowly drops due to the heat losses.

The means 12 detects the temperature increase $\Delta l$ and in case also the pulse time $\Delta t$ from the fed electrical output signals of the heat detectors 7, 8 and especially by means of heat detectors 16. The numeric computation of the laser irradiation power from the measured difference in temperature as well as the measured pulse time, the mass m of the first body 1 and the material-specific heat capacity value $C_{cu}$ (if the body 1 consists of copper) is effected by a downstream data processing system 13 which particularly controls also the installation 14 emitting laser irradiation. The computation is effected for example under use of the formula given in the introduction part of the specification. The power measuring value N can then be picked on the output of the data processing system 13. A typical value is N=5020W (m=85 g, $C_{cu}$=0.356 Ws/g degrees; $\Delta l$=15.3 degrees; $\Delta l$=100 ms). With the apparatus according to the invention an absorption factor $\epsilon$ of more than 0.98 and errors below 2% are obtained. These values of error are below the measuring accuracy of the corresponding measuring devices. These values are not obtained with the method as applied up to present.

The first body 1 can be coupled to said last-mentioned installation emitting the laser irradiation in the area of its opening 5 through which the laser irradiation passes so that the laser irradiation enters the body 1 at a predetermined position, namely in the area of opening 5 and under a predetermined angle. To this end the first body 1, in the area of its opening, has a geometrical shape corresponding to the geometrical shape of the installation emitting the laser irradiation. In particular, the first body 1 is conically shaped on the outside thereof in the area of its opening 5. The installation which emits the laser irradiation has a corresponding conical shape in the area of its irradiation output opening. Accordingly, the apparatus 1 can be precisely coupled to the installation emitting the laser irradiation.

The apparatus according to the invention can be brought to the corresponding measuring position by the aid of a swivel arm which is controlled electropneumatically or electromechanically.

The apparatus is well insulated against heat and is arranged for example in a container 15. The container 15 has good heat insulating properties and is filled for example with extruded polystyrene, sigrapore or glass wool.

List of Reference Numbers 1 first body
2 hollow space
3 metal wall of 1
4 first longitudinal end of 1

5 opening in 3
6 second longitudinal end of 1
7 heat detector on 6
8 heat detector on 5
9 second body
10 intermediate space between 1 and 9
11 heat transfer medium
12 means for forming temperature differentiation values
13 data processing system
14 installation for emitting laser irradiation
15 heat insulating container
16 heat detector copper-constantan (independent thermo element for the measuring of 1)

I claim:

1. Apparatus for power measurement of laser irradiation comprising:
   a first elongate body forming a hollow space, having first and second longitudinal ends, and comprising a metallic wall, wherein the wall comprises a material of small thickness and good thermal conductivity, wherein said first elongate body has an opening on the first longitudinal end for receiving laser irradiation, wherein said first elongate body has a black surface in an area covered by laser irradiation in the hollow space, and wherein said first elongate body has a first heat detector on the first longitudinal end and a second heat detector on the second longitudinal end, wherein said first and second heat detectors are adapted to be coupled to a means for processing electrical output signals of the heat detectors,
   a second elongate body surrounding the first elongate body on longitudinal sides and on the second longitudinal end and, together with said first elongate body, forming an intermediate space wherein a vaporable heat transfer medium can be inserted.

2. Apparatus according to claim 1, wherein the first elongate body and the second elongate body consist of copper or a material of good thermal conductivity.

3. Apparatus according to any one of the preceding claims, wherein the first and second heat detectors comprise copper-constantan thermocouples.

4. Apparatus according to claim 1, wherein the first elongate body and the second elongate body are formed as cylinders or polygonal bodies.

5. Apparatus according to claim 1, wherein the ratio between the length of the first elongate body and its diameter is greater than about 3.

6. Apparatus according to claim 1, wherein the intermediate space has a capillary structure.

7. Apparatus according to claim 1, wherein the first and the second longitudinal ends of the first elongate body further define the hollow space in the elongate body and wherein the first and second longitudinal ends are conical.

8. Apparatus according to claim 7, wherein the cone on the second longitudinal end has an angle of 120°.

9. Apparatus according to claim 6 or 7, wherein the cone on the first longitudinal end has an angle of about 100°.

10. Apparatus according to claim 1, wherein the first elongate body, in the area of the opening for receiving laser irradiation, can be coupled to an installation emitting laser irradiation and wherein the first elongate body and the installation emitting laser irradiation have corresponding geometrical shapes.

11. Apparatus according to claim 10, wherein the first elongate body, in the area of the opening for receiving laser irradiation, is conically formed on the outside thereof and wherein the installation emitting laser irradiation has a corresponding conical form in the area of laser irradiation emission.

12. Apparatus according to claim 1, wherein the apparatus is supported in a heat insulating container.

13. Apparatus according to claim 1 or 2, wherein the first and second heat detectors comprise thermocouples, wherein the thermocouples comprise a non-copper metal of good thermal conductivity of which the first elongate body and the second elongate body are comprised.

14. Apparatus for power measurement of laser irradiation comprising:
   a first elongate body forming a hollow space, having first and second longitudinal ends, and comprising a metallic wall, wherein the wall comprises a material of small thickness and good thermal conductivity, wherein said first elongate body has an opening on the first longitudinal end for receiving laser irradiation, wherein said first elongate body has a rough surface in an area covered by laser irradiation in the hollow space, and wherein said first elongate body has a first heat detector on the first longitudinal end and a second heat detector on the second longitudinal end, wherein said first and second heat detectors are adapted to be coupled to a means for processing electrical output signals of the heat detectors,
   a second elongate body surrounding the first elongate body on longitudinal sides and on the second longitudinal end and, together with said first elongate body, forming an intermediate space wherein a vaporable heat transfer medium can be inserted.

15. Apparatus according to claim 14, wherein said first elongate body has a black surface in an area covered by laser irradiation in the hollow space.

* * * * *